United States Patent [19]
Shealy

[11] 3,749,813
[45] July 31, 1973

[54] EXPANDED SELF-DAMPING ELECTRICAL CONDUCTOR

[76] Inventor: Alexander N. Shealy, 701 Mt. Vernon Rd., Newark, Ohio 43055

[22] Filed: May 31, 1972

[21] Appl. No.: 258,455

[52] U.S. Cl. .................................. 174/42, 174/127
[51] Int. Cl. .......................... H02g 7/14, H01b 5/00
[58] Field of Search ................... 174/13, 16 R, 41, 174/42, 102 SP, 108, 109, 126 CS, 127, 128, 129 R, 130, 131 R, 131 A, 131 B

[56] References Cited
UNITED STATES PATENTS

| 630,501 | 8/1899 | Greenfield | 174/109 X |
|---|---|---|---|
| 1,626,776 | 5/1927 | Austin | 174/131 R X |
| 3,192,310 | 6/1965 | Forest | 174/127 |
| 3,286,020 | 11/1966 | McLoughlin | 174/42 |
| 3,553,350 | 1/1971 | Rawlins | 174/42 |
| 3,105,866 | 10/1963 | Little | 174/42 |

FOREIGN PATENTS OR APPLICATIONS

| 834,931 | 2/1970 | Canada | 174/42 |
|---|---|---|---|
| 734,055 | 7/1932 | France | 174/127 |
| 771,623 | 7/1934 | France | 174/128 |
| 392,076 | 3/1924 | Germany | 174/127 |
| 1,092,809 | 11/1967 | Great Britain | 174/127 |

*Primary Examiner*—Laramie E. Askin
*Attorney*—William V. Miller, Robert E. Stebens et al.

[57] ABSTRACT

An expanded, self-damping conductor structure is provided in which the overall diameter and the peripheral surface area exposed to the surrounding air can be made very large as compared to the material used, and in which there are inherent superior self-damping characteristics. The conductor is comprised of a main conductor component or element enclosed within a larger diameter flexible shielding tube. The main conductor element provides most of the required conductance and all of the required strength. The flexible tube provides an overall diameter of sufficient size as required to limit the surface voltage gradient to acceptable values for the transmission voltage involved, assuring good corona, audible noise and radio noise performance. When installed under tension in overhead transmission lines, the tensioned main conductor element supports itself and the nontensioned, loose-fitting outer flexible tube, and the entire conductor throughout its length constitutes an effective vibration damper of the festoon type. The wind induced intermotion of the flexible tube and the main conductor element causes clashing and rubbing which action dissipates vibration energy and enhances the self-damping characteristics of the conductor. The conductor structure has the unique design advantage that the conductance, strength and diameter can be independently controlled within wide limits of design.

14 Claims, 9 Drawing Figures

PATENTED JUL 31 1973 3,749,813

EXPANDED SELF-DAMPING ELECTRICAL CONDUCTOR

APPLICATION OF INVENTION

This invention relates to overhead lines for the transmission of electric power, specifically to an improved expanded-type conductor with inherent superior self-damping characteristics. Since its diameter can be made very large as compared to the cross sectional area of material used, the conductor is especially applicable for use on ultra high voltage (UHV) lines in the order of 1,000 kilovolts (kv) to 1,500 kv and higher, and to a lesser degree for use on extra high voltage (EHV) lines in the order of 500 kv to 765 kv, either as a single conductors or in bundles. Diameters of five inches and larger with conductive metal areas as small as 1,000,000 circular mils (1,000 mcm) or less are contemplated. Because of its superior self-damping characteristics, the conductor is applicable for use on lines of all voltages where aeolian vibration, galloping or subconductor oscillation is a problem.

BACKGROUND OF INVENTION

To meet the needs of ever increasing transmission voltages requiring larger conductor diameters to limit the surface voltage gradient and thereby to provide acceptable corona and radio noise performance, there is a long history of progress in the expanded-type conductor art. Good examples are covered by U. S. Pat. No. 1,489,402 dated Apr. 8, 1924 to Varney and U.S. Pat. No. 3,291,898 dated Dec. 13, 1966 to Sandel. These patents state the need for the requirements of expanded type conductors. These and other designs heretofore available are based on omitting material in the interior of the conductor, and in order to provide a sound mechanical structure with adequate radial strength to prevent structural collapse and crushing, and to provide good torsion characteristics, it is generally necessary to use at least two outer layers of wires. Since the outer layers comprise a large percentage of the total cross sectional area, this often results in a greater area of conductive material than otherwise required from a current conducting standpoint, especially for UHV lines. Although these designs are reasonably satisfactory for voltages up to 500 kv, they have serious design limitations for the large diameter, small conductive area conductors needed for the UHV lines. These limitations can be better understood by considering the 2.5 inches diameter, 3,108 mcm expanded ACSR conductor constructed under the teachings of U. S. Pat. No. 3,291,898 and believed to be the largest diameter transmission conductor in commercial service. This 2.5 inches diameter, 3,108 mcm conductor has two outer layers of 28 and 34 aluminum wires each 0.2035 inch diameter and containing a total area of 2,567 mcm. If the conductor diameter were doubled from 2.5 inches to 5 inches and 0.2000 inch diameter wires used for the two outer layers, the total area of conductive metal would increase from 3,108 mcm to about 7,000 mcm, and the area of the two outer layers of wires would increase from 2,567 mcm to 5,520 mcm. Further, the two outer layers would have 66 and 72 wires, making the fabrication of the 5 inches diameter conductor difficult and requiring a very large stranding machine. It can be seen that the design is not suitable for large diameter small area conductors and the same is true of other designs heretofore available. However, under the teachings of this invention, a 5 inches diameter or larger conductor with 1,000 mcm or smaller area can be provided.

As an alternative to expanded conductors it is common practice to use bundle conductors of two, three or four subconductors, as covered by U. S. Pat. No. 1,078,711 to Whitehead, dated Nov. 18, 1913, and this practice has been generally satisfactory for EHV lines. Research, planning and preliminary designs are now being carried out for near future installation of UHV lines for voltages of 1,100 kv and 1,500 kv, and even higher voltages are expected to follow. This research and the preliminary designs are based on bundle conductors comprised of six, eight, 12 and 16 subconductors, and even as many as 24 are being considered. While prototypes of such bundle conductor arrangements can be constructed for laboratory testing, it does not seem practical to use so many subconductors for overhead long span transmission lines subject to the usual wind and ice conditions. Further, the use of so many conventional subconductors of even relatively small size will result in excessive conductive-metal area and weight, substantially more than otherwise can be justified. The use of improved expanded type conductors, according to the teachings of this invention, with large diameters and relatively small areas in bundles of two, three or four subconductors is indicated as the practical solution.

Regarding self-damping conductors, the problems of vibration also have led to a long history of progress in the self-damping conductor art. Examples are covered by U. S. Pat. No. 3,445,586 dated May 20, 1969 to Edwards and Mussen and U.S. Pat. No. 3,619,480 dated Nov. 9, 1971 to Baker and Rawlins. These patents describe the problems of vibration and the self-damping effect of intermotion of elements of the conductor. These conductor structures as well as others heretofore available use the outer layer or layers of conductive wires as a sheath or mantle and therefore have the same design limitations for large diameter small area conductors as already discussed under expanded conductors. Further, the outer layers of wires forming the mantle are tensioned and exhibit vibratory motion which causes interference with other "untuned" elements to provide self-damping. In contrast, the conductor under the teachings of this invention relies chiefly on the movement of the non-tensioned outer flexible tube or mantle to provide the self-damping, as hereinafter described.

A further effort has been made to avoid the wind-produced vibration through aerodynamically configured composite structures. This effort is exemplified in U. S. Pat. No. 3,286,019 to McLaughlin and Starr and U.S. Pat. No. 3,286,020 to McLaughlin. These efforts were directed to eliminating the vibration, as acknowledged in the specification, rather than compensating for or counteracting vibration as is the teaching of this invention and found to provide more satisfactory results.

BRIEF SUMMARY OF THE INVENTION

The conductor covered by this invention is comprised of a main conductor component or element enclosed in a larger diameter flexible shielding tube or mantle. One purpose of the main conductor element is to provide most of the conductance required, all except that provided by the shielding tube. The other major purpose of the main conductor element is to provide all of the strength required. In the design of the conductor, this conductance and strength can be controlled independently of the diameter and independently of each other. Preferably, a conventional bare concentric stranded conductor of the Aluminum Conductor Steel Reinforced (ACSR) type, or of the Aluminum Conductor (aluminum) Alloy Reinforced (ACAR) type would be used for the main conductor element, but any stranded conductor with sufficient conductance and strength for the intended application could be used. For example, an All Aluminum (EC grade) Conductor (AAC) type could be used if it provided sufficient strength. The other extreme would be the use of a steel cable if it and the tube provided the required conductance.

One purpose of the flexible shielding tube is to provide an overall diameter and peripheral surface area exposed to the surrounding air of sufficient size as required to limit the surface voltage gradient to acceptable values for the transmission voltage involved, insuring good corona, audible and radio noise performance. The objective, of course, is to provide this large diameter with a minimum of material and weight, which can be done under this invention. The tube serves as an electrostatic shield for the smaller main conductor element.

Another purpose of the flexible shielding tube is to provide a loosely supported non-tensioned mantle which is free to move in the wind and which in doing so contacts and clashes with the main conductor element. Such contacts and clashes together with the rubbing action dissipate vibration energy and thereby provide superior self-damping characteristics to the conductor. When installed under tension in overhead transmission lines, the tensioned main conductor element supports itself and the non-tensioned loose fitting outer flexible tube, and the entire conductor throughout its length constitutes an effective vibration damper of the festoon type. Further, the flexible tube which is directly exposed to the wind will not transmit vibratory wave motion along its length since it is not tensioned. The main conductor element which is tensioned and which therefore will transmit vibratory wave motion along its length is shielded from the wind by the tube, thus preventing the usual wind induced forces which cause and sustain resonant conductor vibration.

Another purpose of the overall tube is to provide some of the conductance required, however, usually this would be of secondary importance in the design of the tube itself.

Preferably, the flexible tube would be of a light weight metal such as aluminum alloy but could be any conductive or semi-conductive material. When conductive material is used, its conductance would be deducted from the total conductance required and the main conductor element designed to provide the remainder. The tube element would be electrically connected to the main conductor element and not insulated from it. The inside and outside surfaces of the tube would be smooth with no rough or sharp projections, the inside to prevent abrasion of the main conductor element, and the outside to improve the corona and radio noise performance of the conductor. The tube would be sufficiently flexible to permit the finished conductor to be placed on reels for handling, shipment and installation. Also, it would be sufficiently flexible to permit the loose fitting tube to move freely in the wind after installation. Flexible tubes in common use for liquid and gas applications, for protective armor on electrical insulated cable conductors and for electrical conduit are suitable for use as the shielding tube. Preferable, the flexible interlocked "BX" type commonly used as protective metallic armor on electrical insulated cable conductors would be used, but "Square Lock" tubing and circumferentially and helically corrugated metal tubing can be used. Also, semiconductive synthetic rubber-like and plastic type flexible tubes can be used.

Optionally, the shielding tube can be provided with holes of uniform or variable size and shape, regularly or irregularly spaced around its perimeter and along the length of the conductor, if desired to further enhance the anti-vibration characteristics of the conductor and otherwise improve its performance. When installed in service, these holes would:

1. Reduce the Karman Vortex eddies on the lee side of the conductor when exposed to cross winds, minimizing aeolian vibration.

2. Reduce vacuum build up on lee side of conductor when exposed to cross winds and reduce drag forces or wind load on conductors and structures, especially important for very large sizes.

3. Provide improved cooling by air passage including "chimney effect".

4. Provide improved ventilation and minimize corrosion.

5. Provide improved drainage of condensate and other water which might enter the tube.

6. Improve dispersion of rain water during rain storms and minimize audible noise.

7. Reduce conductor weight slightly without significant loss of strength of the tube.

Also, if desired, springs or spacers can be provided between the main conductor element and the flexible tube to further enhance the self-damping characteristics of the conductor, to control electrical contract between the tube and the main conductor element, and to prevent chattering in the wind. In service, the main conductor element will act as a messenger between structures and support its own weight as well as that of the loose fitting, non-tensioned flexible tube and the springs. The springs limit or control the movement of the flexible tube on the main conductor element, which wind induced movement dissipates vibration energy and prevents or minimizes vibration, as already discussed. While the entire conductor without springs is a vibration damper of the festoon type, the addition of springs changes it somewhat to a more effective spring-loaded, distributed-mass-type damper. If springs are used, they can be made of metallic wire or strip, or of foam or synthetic rubber-like material having sufficient resiliency. They may be in the form of a continuous wire, strip, bar or tube, or they may consist of a number of short units uniformly or randomly spaced along the length of the conductor. The springs can be placed on one side of the main conductor element to obtain direct contact between it and the tube, or arranged to keep the main conductor element at or near the center of the tube under static conditions. In the latter case, if non-conductive spring material is used, provision would be made to connect the main conductor element to the tube electrically at frequent intervals.

Advantages of the conductor under the teachings of this invention include:

1. Diameters as large as required, with minimal weight increase, can be provided to limit the surface voltage gradient to acceptable values at EHV and UHV transmission voltages when used as single conductors and as subconductors in bundles.
2. Conductance or conductive material area can be limited to the optimum amount required to transmit the power or current.
3. Strength can be provided as required for the desired line design.
4. Diameter, conductance and strength, as covered by the three items next above, can be independently controlled within wide limits of design as required for the intended application.
5. Superior self-damping characteristics.
6. Lower conductor and structure loads.
7. Superior cooling characteristics.
8. Lower transmission line costs.
9. Improved service reliability of UHV lines, especially as compared to bundle conductor lines having more than four subconductors.

The conductor covered by this invention will be better understood, and its advantages and objectives appreciated more, from the following description of embodiments of this invention together with the appended drawing.

PREFERRED EMBODIMENTS OF THE INVENTION

Figure 1:
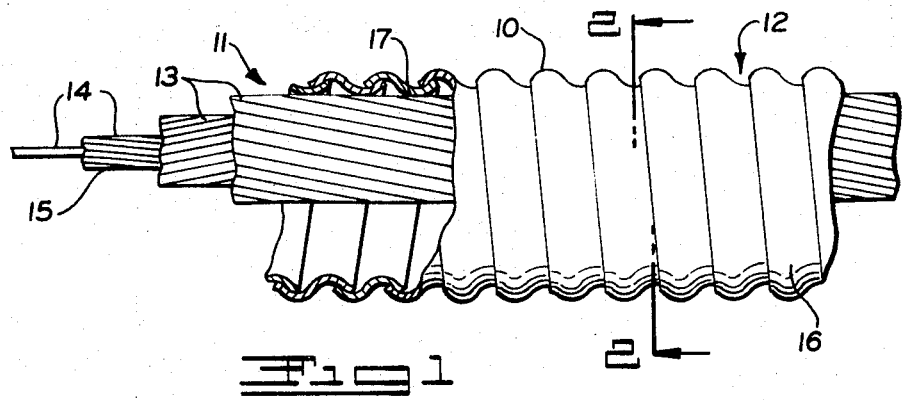
FIG. 1 is an elevational view of a length of the conductor with portions broken away, showing one embodiment of this invention.
Figure 2:
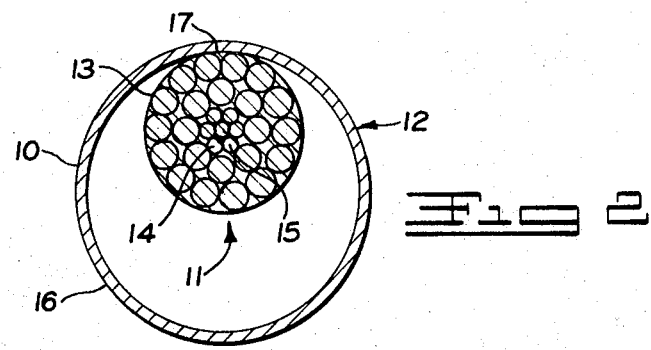
FIG. 2 is a transverse sectional view of the same conductor, taken along line 2—2 of FIG. 1.

One of the embodiments of this invention is shown in FIG. 1 and FIG. 2 of the appended drawing. Specifically, the conductor 10 comprises a main conductor component or element 11 for conductance and strength, and a flexible tube element 12 for shielding. The main conductor element 11 shown in FIG. 1 and FIG. 2 is a conventional bare concentric stranded ACSR type conductor, preferably made of a plurality of EC grade aluminum wires 13 helically and tightly wound about a plurality of concentrically stranded steel wires 14 forming a core 15, all in the usual manner well known in the art. The size and number of aluminum wires 13 and the number of layers of these wires would be varied to meet the conductance requirements. Likewise, the size and number of the steel wires 14 for the core 15 would be varied to meet the strength requirements.

The flexible shielding tube 12 shown in FIG. 1 and FIG. 2 is preferably made of an aluminum alloy strip in the order of 0.025 inch to 0.100 inch thick and in the order of 0.500 inch to 1.500 inches wide, formed as it is spirally wound around the main conductor element 11 to form an interlocked, loose-fitting flexible tube 12 of the diameter required for the intended voltage application. The thickness and width of the strip 16 would be varied as required, together with the degree of forming, so that the finished tube 12 would have sufficient radial strength to withstand, without permanent deformation or damage, the forces incidental to manufacture, handling, shipment, installation and design loading. The desired degree of interlocking would be provided by the forming operation so that the integrity of the tube 12 would be maintained over the life of the conductor 10, but it is not intended that the tube 12 will contribute tensile strength to the conductor 10. The selection of the alloy of the strip 16 would be based on cost, strength, formability, hardness, resistance to abrasion, resistance to corrosion, mass or weight and conductivity. Appropriate dimensioning of the strip in relation to its weight results in a predetermined minimum mass that effectively interferes with the oscillation of the tensioned conductive element. The tube 12 would be electrically connected to the main conductor element 11 by numerous supporting contacts at points 17, as indicated in FIG. 1 and FIG. 2, and no electrical insulation would be used.

Figure 3:
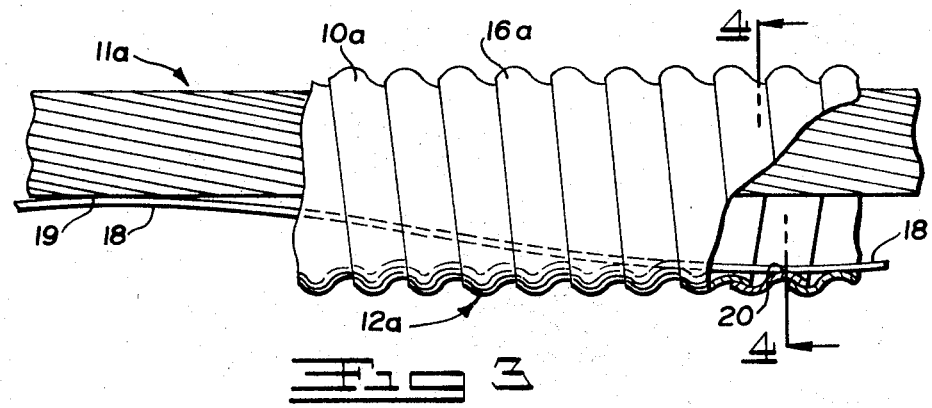
FIG. 3 is an elevational view of another embodiment of this invention with portions broken away.
Figure 4:
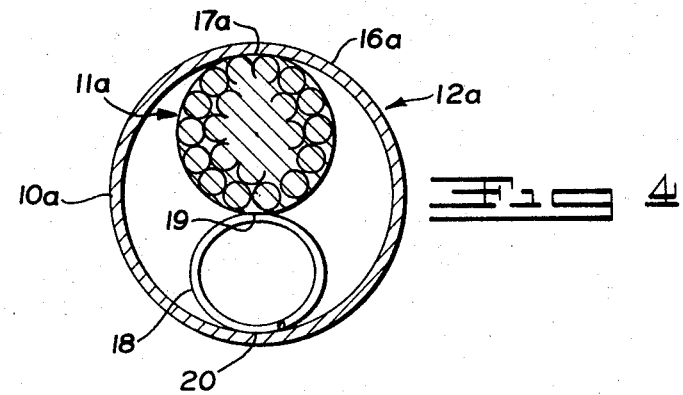
FIG. 4 is a transverse sectional view of the same conductor taken along line 4—4 of FIG. 3.

Another embodiment of this invention is shown in FIG. 3 and FIG. 4 wherein the conductor 10a is a modification of the conductor 10 of FIG. 1 and FIG. 2 just described by the addition of springs 18 between the main conductor element 11a and the tube 12a. In the interest of brevity the main conductor element 11a and the tube 12a of conductor 10a will not be described in detail since they are similar to those of conductor 10 just described. The spring 18 as shown in FIG. 3 and FIG. 4 is comprised of a wire-formed, open-helix, with pitch length in the order 6 inches to 24 inches and diameter designed to maintain pressure between the main conductor element 11a and the inside of the tube 12a. It would be inserted alongside the main conductor element 11a just ahead of the operation forming the strip 16a into tube 12a. The spring 18 can be continuous or can be units of lengths in the order of 10 feet long. The material for the springs 18 would be selected on the basis of cost, resiliency, hardness, formability, resistance to fatigue, resistance to abrasion and resistance to corrosion. Suitable materials include stainless steel, galvanized or aluminized steel and certain of the aluminum alloys. The size of the wire as well as the pitch length and diameter of the helix would be designed to maintain the desired pressure at points 17a, 19 and 20, as indicated in FIG. 3 and FIG. 4, which points serve as electrical contact points. The springs 18 would limit or control the intermovement of the tube 12a and the main conductor element 11a. When installed under tension between structures in an overhead transmission line, the conductor 10a with the springs 18 between the main conductor element 11a and the loosely fitting, non-tensioned flexible tube 12a becomes an effective vibration damper of the spring-loaded, distributed mass type throughout the length of the line, enhancing the self-damping characteristics of the conductor 10a. Also, the springs 18 prevent chattering in the wind.

Figure 5:
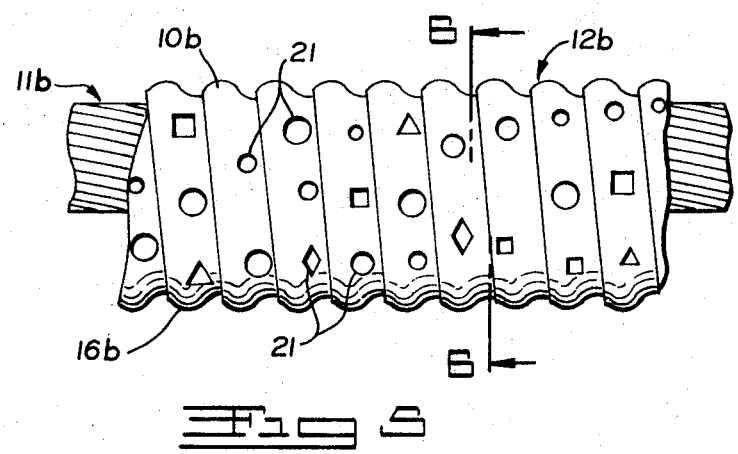
FIG. 5 is an elevational view of another embodiment of this invention.

A third embodiment is shown in FIG. 5 wherein the conductor 10b is modified by the addition of holes 21 in the flexible tube 12b. It will be understood that this option can be used on conductors with or without springs between the main conductor element and the tube. The strip 16b can be punched before it is used to form the flexible tube 12b, to provide the holes 21 as indicated in FIG. 5, around the main conductor element 11b of the conductor 10b. These holes 21 may be of uniform or varied size and shape, and of regular or irregular spacing around the perimeter of the tube 12b and along the length of the conductor 10b. The effect and advantages of the holes 21 have been enumerated and in the interest of brevity will not be repeated.

Figure 6:
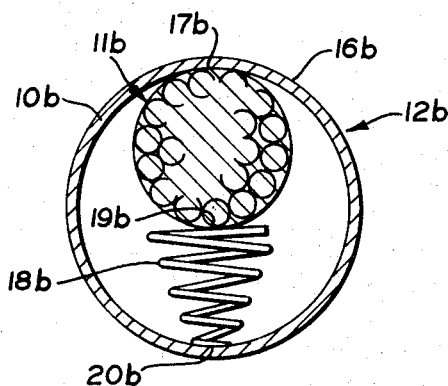
FIG. 6 is a transverse sectional view taken along line 6—6 of FIG. 5.
Figure 7:
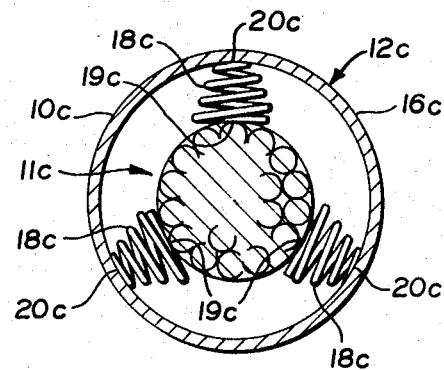
FIG. 7 is a transverse sectional view, similar to FIG. 6, showing a modified arrangement with the main conductor element located at or near the center of the outer flexible shielding tube.

The embodiment of FIG. 6 shows a further modification in that a different type spring 18b has been substituted for the spring 18 shown in FIG. 3 and FIG. 4. These unit springs 18b would have suitable clips (not shown) to hold them on the main conductor element 11b while the tube 12b is being formed and spirally wound around the main conductor element 11b and the springs 18b. These unit type springs 18b would be uniformly or randomly spaced along the length of the conductor 10b at intervals in the order of 2 feet to 3 feet. Alternatively, the single large spring 18b shown in FIG. 6 may be replaced, if desired, with three smaller springs 18c to obtain the arrangement shown in FIG. 7 with the main conductor element 11c at or near the center of the tube 12c.

It will be understood that a spring made from a continuous flexible metallic strip formed into a suitable shape, such as a modified "S," can be substituted for the wire helix type spring 18 shown in FIG. 3 and FIG. 4. If desired, one side of this strip spring may be formed concave to nest against the main conductor element 11a and the other side convex to nest against the inside of the tube 12a. Additionally, if desired, this strip spring can be a number of short sections or units in the order of 2 inches to 4 inches long instead of continuous, uniformly or randomly spaced along the length of the conductor 10a. Likewise, rubber-like resilient material in the form of a tube or other continuous shape, or in short unit lengths uniformly or randomly spaced along the length of conductor 10a, 10b or 10c can be substituted for the metallic springs 18, 18b and 18c shown in FIGS. 3-7 with due consideration toward maintaining electrical interconnection of the conductor element and tube. This includes springs or spacers of resilient foam type materials. It is apparent that the spring component as shown in these figures might take any of many possible forms and might be of any of many possible materials for the conductor under the teachings of this invention.

The ACSR type conductor shown in FIGS. 1-7 for the main conductor element 11, 11a, 11b and 11c is for the purpose of illustration only, and it will be understood that the type and size of conductor used is a matter of design choice. It may be a single metal or a combination of metals to provide the required conductance and strength, and it may be in the form of one or more than one stranded cable. For example, a concentric stranded all aluminum conductor (AAC) of a plurality of EC grade aluminum wires primarily for conductance, together with a separate stranded galvanized steel cable for strength, the two cables intertwisted or laid parallel in the flexible shielding tube, could be used for the main conductor element.

Similarly, the "BX" type flexible tube shown in FIGS. 1-7 for the shielding tube or mantle 12, 12a, 12b and 12c is for the purpose of illustration only, and it will be understood that other types of flexible conductive or semi-conductive tube can be used under the teachings of this invention. Included are helically or circumferentially corrugated metallic tubes and various synthetic rubber-like and plastic tubes having the required electrical conductivity. For example, the tube in any of the embodiments described herein may be formed from a synthetic resinous material having the requisite electrical conductivity.

Figure 8:
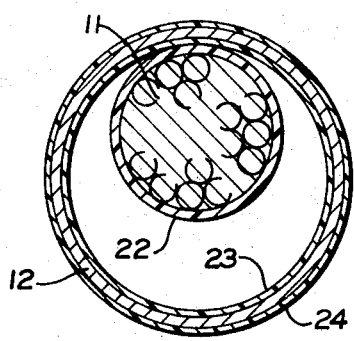
FIG. 8 is a transverse sectional view of a conductor similar to that of FIGS. 1 and 2.

While the embodiment illustrated in FIG. 1 and FIG. 2 is preferably fabricated as a bare metal conductive element and tube, either or both contacting surfaces may be coated with a synthetic resinous material that is suitably resilient having the requisite electrical conductivity. Coatings 22 and 23 are shown applied to the conductive element and tube of a conductor in FIG. 8 to better illustrate this embodiment which has the advantage of substantially reducing audible noise produced by the relative oscillations. In addition, an exterior coating 24 of the same or similar material may be applied to the exterior of the conductive tube 12.

Figure 9:
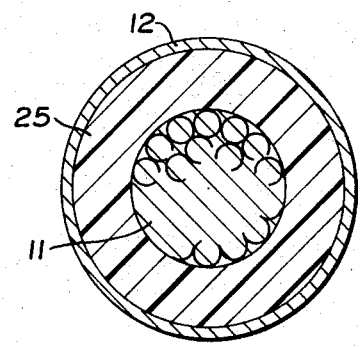
FIG. 9 is a transverse sectional view similar to FIG. 7 showing a modification of the resilient means.

The structural arrangement where the central area between the conductive element 11 and the tube 12 is provided with a resilient spacing member other than the metallic springs is shown in FIG. 9. In this transverse sectional view, the resilient spacing of the conductive tube and element is provided by a synthetic resinous material 25 that substantially fills the annular space and normally supports the element and tube in coaxial relationship. This material 25 is conductive or semi-conductive to electrical interconnect the conductive element 11 and tube 12. In the axial direction of the conductor constructed in accordance with the embodiment the resilient material 25 may be formed as a plurality of relatively short sections that are longitudinally spaced apart or the material may be continuous throughout the conductor.

Preferred embodiments have been described which can be used in various combinations of main conductor elements, tubes with and without holes, and conductors with and without springs of various types, etc., to provide a wide choice of design, but these specific embodiments are not limiting. It will be apparent to those skilled in the art that variations and modifications may be practiced without departing from the intended scope and teachings of this invention, as hereinafter claimed.

Having thus described this invention, what is claimed is:

1. An expanded-diameter, self-damping electrical conductor for overhead suspension from spaced supports comprising an elongated, electrically conductive element adapted to be suspended under tension; and an elongated, electrically conductive, flexible tube axially receiving said conductive element and supported thereon in untensioned, electrically contacting relationship, said tube having an internal cross-sectional area greater than the cross-sectional area of said conductive element to permit transverse movement relative thereto and having a predetermined minimum mass as to provide mechanical interference to oscillatory movement of said conductive element, at least one of said conductive element and conductive tube having a contacting surface thereof coated with an electrically conductive, resilient material.

2. An electrical conductor according to claim 1 wherein said conductive element and conductive tube both have their respective contacting surfaces coated with an electrically conductive, resilient material.

3. An electrical conductor according to claim 1 wherein said conductive tube has the exterior surface thereof coated with an electrically conductive, resilient material.

4. an electrical conductor according to claim 1 wherein said conductive tube is formed with a plurality of holes.

5. An electrical conductor according to claim 4 wherein said holes are non-uniformly sized and randomly spaced relative to each other.

6. An expanded-diameter, self-damping electrical conductor for overhead suspension from spaced supports comprising an elongated, electrically conductive element adapted to be suspended under tension;

an elongated, electrically conductive, flexible tube axially receiving said conductive element and supported thereon in untensioned, electrically contacting relationship, said tube having an internal cross-sectional area greater than the cross-sectional area of said conductive element to permit transverse movement relative thereto and having a predetermined minimum mass as to provide mechanical interference to oscillatory movement of said conductive element; and resilient means interposed between said conductive element and conductive tube to inhibit relative transverse movement therebetween.

7. An electrical conductor according to claim 6 wherein said conductive tube is formed from a synthetic resinous material having a property of electrical conductance.

8. An electrical conductor according to claim 6 wherein said resilient means comprises an axially extending, helical spring.

9. An electrical conductor according to claim 8 having a plurality of said springs relatively disposed in axially spaced relationship.

10. An electrical conductor according to claim 6 having a plurality of compression springs disposed in axially spaced relationship, each of said springs interposed between said conductive element and tube to urge said element into contacting relationship with said tube wall.

11. An electrical conductor according to claim 6 having a plurality of compression springs disposed at predetermined points along the axial dimension of the cable, said plurality of springs at each point angularly spaced around said conductive element to maintain said element in spaced relationship to said tube.

12. An electrical conductor according to claim 6 wherein said resilient means comprises a synthetic resinous material which is electrically conductive.

13. An electrical conductor according to claim 12 wherein said resinous material extends throughout the length of the conductor.

14. An electrical conductor according to claim 12 wherein said resinous material is formed in discrete units disposed in axially spaced relationship.

* * * * *